United States Patent [19]

Crosswy et al.

[11] Patent Number: 5,325,532
[45] Date of Patent: Jun. 28, 1994

[54] AUTOMATIC DEVELOPMENT OF OPERATING SYSTEM BOOT IMAGE

[75] Inventors: Wm. Caldwell Crosswy, Spring; Dwight L. Barron, Houston; David W. Abmayr; Harvey M. Rosenblum, both of Spring; David M. Burckhartt, Houston, all of Tex.

[73] Assignee: Compaq Computer Corporation, Houston, Tex.

[21] Appl. No.: 951,226

[22] Filed: Sep. 25, 1992

[51] Int. Cl.$^5$ .................................... G06F 9/445
[52] U.S. Cl. .................. 395/700; 364/DIG. 1; 364/280.2; 364/280.3; 364/280.8; 364/280.9
[58] Field of Search ............... 395/700; 364/DIG. 1, 364/280.2, 280.3, 280.8, 280.9

[56] References Cited

U.S. PATENT DOCUMENTS 4,589,063  5/1986  Shah et al. ................. 364/200
5,136,709  8/1992  Shirakabe et al. .

FOREIGN PATENT DOCUMENTS

0429252A2  5/1991  European Pat. Off. .
04484954A2 5/1991  European Pat. Off. .
2203869A   10/1988 United Kingdom .

*Primary Examiner*—Gareth D. Shaw
*Assistant Examiner*—A. Katbab
*Attorney, Agent, or Firm*—Pravel, Hewitt, Kimball & Krieger

[57] ABSTRACT

A computer system which includes certain minimum capabilities in a system ROM. Device driver software is located in the system ROM or adapter ROM's. On boot the computer system collects these device drivers from ROM to develop a minimal system. If a removable medium such as a floppy disk or CD-ROM is present a configuration mode is entered when final driver files and operating system modules are stored on a selected hard disk. After this storage the device driver modules and operating system modules necessary to develop a boot image of the operating system are gathered and linked. The boot image is generated and stored, allowing use on the following boot operations. The computer system detects device changes and rebuilds the boot image as necessary. If the devices have remained the same the previously stored boot image is loaded and operating system execution commences.

6 Claims, 6 Drawing Sheets

AUTOMATIC DEVELOPMENT OF OPERATING SYSTEM BOOT IMAGE

BACKGROUND OF THE INVENTION

1. Field of the Invention

The invention relates to operating systems utilized in computer systems, and more particularly, to the automatic development of a bootable image of an operating system for a particular computer.

2. Description of the Related Art

In their beginnings, computer systems were very complicated items which required constant attention and skilled operators and were very expensive. Because of this, each computer could effectively be considered a custom or unique entity. With the resources available, it was readily possible to customize and fine tune the bootable or run time image of the operating system of the computer for each individual computer. While this was often a complicated task, the number of generations of different versions was limited because of the relatively few variations of and modifications to the system. The cost of this development was in proportion with the cost of the computer system itself. However, this all abruptly changed with the development of the microprocessor and microprocessor-based computer systems. Costs plummeted, relatively, and systems became much more variable. One classic example of a microprocessor-based system utilized the S-100 bus system. In the 1970's and early 1980's numerous manufacturers were making various circuit boards which had varying functions, which all operated using the S-100 standard. Thus peripheral devices, such as terminals or video and keyboard systems, floppy and hard disk controllers, serial and parallel ports and other hardware interface items were quite variable. If operating systems were to incorporate all of the customized features as previously done in larger computer systems, the cost of developing the operating system, particularly the individual boot or loadable image, would have greatly exceeded the cost of the entire computer system itself.

To this end Digital Research Inc. developed an operating system referred to as CP/M. One of the features of CP/M was that it broke the operating system into two distinct portions: 1) the basic input/output system (BIOS) and (2) the remaining portions or the core of the operating system. The BIOS was intended to provide each developer a means for developing the particular interface code required for the hardware of that particular computer. The operating system itself then would be compatible across the number of different systems without change. A developer needed only to develop the particular code necessary to handle the particular hardware of that system, and then the CP/M operating system could be utilized. Changes did not have to be made to the core operating system for each particular system. CP/M and S-100 based systems, in their infancy, were very simple systems. However, even with these simple systems it was hard to get an isolated system operational. Since the software needed for the BIOS would have been provided by the board manufacturer, it generally had to be properly placed on the floppy disk and incorporated into the boot loading process. But if the code was necessary for booting the system, then this was a problem, unless another system was available. Therefore it was relatively hard to develop and configure an isolated system.

Additionally, as computer systems became complex the CP/M operating system became quite limited and many features were available which were not recognized by CP/M. A classical example was higher end graphical video interfaces, because CP/M was only text based. To solve this problem, developers began circumventing the operating system in many cases. Additionally, certain system level functions which were desirable had not been available in the systems and so were not addressed in the core operating system. Examples were timers, direct memory access (DMA) capabilities and high levels of interrupt functionality. Each vendor implemented the functions differently and so disks and programs became much less portable, because each developer patched CP/M as needed.

In response to the growing demand for more powerful computer systems, International Business Machines Corp. (IBM) developed and introduced the IBM PC. The IBM PC was developed around an Intel Corporation 8088 microprocessor. The PC/DOS or MS/DOS operating system from Microsoft Corp. was incorporated and utilized with the IBM PC. While MS/DOS had similarities with CP/M, one change was made so that the interrupt, timer and DMA functions were made an integral part of the operating system itself. The particular hardware relating to the interrupts, the timers and DMA was located on the system board of the computer itself and therefore it was considered not to be a changeable item, so that incorporation into the operating system core was acceptable. Various devices, such as the video system, the hard disk and floppy disk drive controllers and the various serial and parallel ports were considered to be changeable items as they were commonly located in interchangeable slots. Therefore, these items remained flexible and utilized what are commonly called device drivers. The device drivers could either be located in the system ROM provided by the manufacturer or could be located on floppy disk, which could then be incorporated into the runtime operating system. As part of the setup and initialization of an MS/DOS system, these various extended device drivers were referenced and included into the operating system as it was being loaded.

Time passed and computer systems again became more powerful. MS/DOS became limited and so extensions were rapidly developing to it, particularly in the video area and other areas where performance was limited. Because certain system level functions were incorporated into the core of MS/DOS, it was a relatively non-transportable system, that is, major portions would have been rewritten to transfer to a system having certain functions in other locations or differently defined. Further, MS/DOS had similar initial configuration problems as CP/M.

Another major operating system, UNIX, was being developed at the same time as CP/M and MS/DOS. UNIX was also a relatively non-transportable system which was hard to initially configure. In order to boot a UNIX-based system, it was required that a complete binary boot image of the run time operating system, including all of the necessary device drivers and system board interface software, be assembled into a single module which was then loaded. However, this was difficult to do on a single standalone system because all of the various drivers had to be gathered and then assembled, and became very difficult when the system was not operational. Conventionally, all the necessary device drivers were loaded onto another UNIX system and the generation process performed there, with the result being returned to the intended system. For various reasons UNIX became a standard operating system with the advantage that the application programs were freely transportable between various hardware platforms. However this transportability was not true of the core UNIX operating system because the core or kernel also included certain system board or system related hardware code. This varied between hardware platforms. Therefore the UNIX kernel had to be re-written and re-developed for each particular computer system by each particular manufacturer and was not readily transportable. This limited the widespread use of UNIX.

Therefore, while small computers had started out with the original goal of having a fully transportable operating system, they soon diverged from this goal as they became complex. Further, with this diversion it became significantly more difficult to develop a run time version of the operating system which sufficiently included all of the elements to allow complete operation with the nontransportable systems. Thus a transportable operating system across many diverse platforms that could be developed in relative isolation was not available.

SUMMARY OF THE INVENTION

The present invention provides a method for allowing a transportable operating system to be developed which can be readily configured on a relatively isolated system. In an operating system developed according to the present invention, all non-hardware related functions are contained in the transportable portion of the operating system. Any hardware or potential hardware function is developed through what is called a hardware abstraction layer through appropriate interfaces and calls. This allows the operating system itself to be readily transportable between a multiplicity of hardware platforms.

It is then necessary to develop a hardware abstraction layer for the various hardware related modules so that a fully configured system can be developed. To this end, the hardware abstraction layer is broken down into two individual portions, the main system read only memory (ROM), which contains a certain minimal number of functions, and various hardware modules. The hardware modules may be located either in ROM on an adapter board located in a slot or can be located in a reserved area on a disk in the computer. If the particular module is necessary for an initial load, such as to access the disk, it must be contained in the adapter board ROM. If it is only to be utilized after the operating system has been generated for certain higher level functions, they can be located on the disk and thus not be accessible during the initial configuration process. All of the modules contain certain headers or file names which can be readily accessed according to the functions contained in the main system ROM and any necessary adaptor ROMs. The operating system, including the kernel, various extensions, and a linker, in the case of UNIX, are located in a reserved subpartition of a system partition on the disk related to the operating system. Preferably the kernel and the drivers have specific file names which allow them to be readily linked to the particular function. The various non-loaded hardware interface files or device drivers relating to the various adapters and functions and potentially extended ROM services are also located in the partition, preferably in subpartitions related to the manufacturer. For example, if the underlying hardware platform is developed according to the EISA specification, the adaptor board would be located in a slot and would contain particular information such as the manufacturer identification and board identification. Utilizing the manufacturer and board identification information provided on the adapter itself, a subpartition and file name for use in accessing the drivers is developed.

Development of a bootable image of a particular operating system is generally performed by first making sure that all of the particular driver modules are located in the proper reserved areas and that the operating system elements are located in the proper partition. This is often done by the means of a separate program which utilizes only the minimum services provided by the system ROM and whatever adapter ROMs are necessary for minimal access operations. The driver modules are requested and then loaded to the proper location. After the files are properly located, at the initial configuration, the system ROM includes code which loads the various adapter modules contained in firmware for operation. The preferred or desired operating system is then determined. This can be done by means of monitoring the CMOS or saved memory areas or by querying the operator via certain minimal terminal functions present in the system ROM. A list of the system board identification and the identification of all the various adapters in the system is then developed. A particular program, referred to as INSTALL, for the particular OS is then initiated. The purpose of the INSTALL program is to gather all the various adaptor and operating systems files according to the adapter identification, the system board identification and operating system preference. After all the various modules, both adapter and operating system related, have been gathered, in the case of a UNIX environment, a linker and loader is executed to combine and link all the various files, which are in an object format, into a single binary boot image. The binary boot image can then be loaded onto a target disk. After the target disk has been loaded with the binary boot image, the computer system operating environment can be set to indicate that a reboot or re-initialization process is to occur. The computer then reboots. On reboot the computer system proceeds to determine the various adapters installed. This determination is compared against a list which has been maintained in a permanent location to determine if system configuration has changed. If the system configuration has changed, the configuration process is re-initiated. If the configuration is proper, the operating system is loaded and takes control.

In this manner a configured boot image of the operating system can be developed without requiring access to a similar computer or requiring modification to the kernel of the operating system itself.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
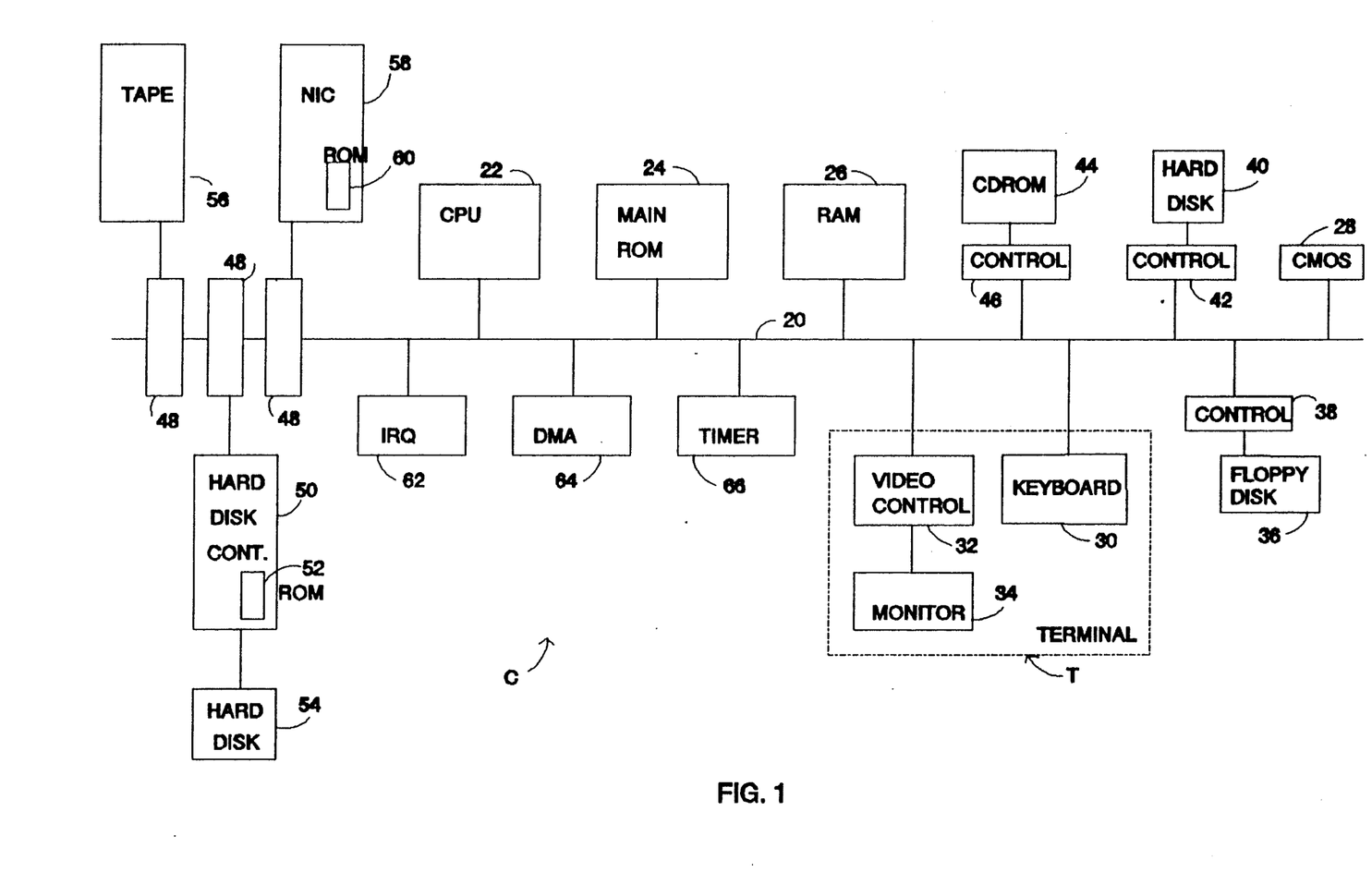
FIG. 1 is a block diagram of an exemplary computer system for operation of the present invention.

Referring now to FIG. 1, a computer system C is generally shown. The computer system C is an exemplary computer system on which an operating system organized and configured according to the present invention operates. As such, none of the specific hardware details or organizations are considered critical but are provided merely for explanatory purposes. Many additional elements can be added and certain elements illustrated can be removed.

In the illustrated computer system C, a bus 20 forms the backbone of the computer System C. Attached to this bus is a CPU 22 which performs the processing functions of the computer system C. The main system read only memory (ROM) 24 and system random access memory (RAM) 26 are connected to the system bus 20 for use by the CPU 22. In an alternate embodiment the CPU 22 and the RAM 26 are on a separate bus which is coupled to the bus 20 by means of various buffers and a bus controller. Additionally, CMOS memory 28 is connected to the system bus 20 for long term but changeable storage of specific information. As an option this can be electrically erasable programmable ROM (EEPROM). A terminal T is also connected to the system bus 20. The terminal T typically includes a keyboard 30, a video controller 32 and a monitor 34 which is connected to the video controller 32. The terminal T allows for operator interface with the computer system C. The computer system C also includes various forms of mass storage, such as a floppy disk drive 36 and its associated controller 38, which is connected to the system bus 20. Additionally, the preferred computer system C also includes a hard disk drive 40 and its associated controller 42, which is connected to the system bus 20. Optionally, a CD-ROM drive 44 and its controller 46 can be connected to the system bus 20. This allows various sources of mass storage to be used in the computer system C. Various serial and parallel ports (not shown) may also be connected to the system bus 20. An interrupt controller 62, a direct memory access (DMA) controller 64 and timer 66 are connected to the system bus 20 to allow the CPU 22 to control these basic functions.

The computer system C also preferably includes a series of slots 48 for use by interchangeable circuit boards or adapters. The slots 48 preferably conform to certain standards, for instance the Extended Industry Standard Architecture (EISA) or TURBOchannel of Digital Equipment Company (DEC). To allow this capability, the bus 20 may actually be two or more separate buses so that CPU performance and adaptor performance can be separately maximized with appropriate control and conversion circuits connecting the various buses. One exemplary adapter is a second hard disk controller 50. Preferably the hard disk controller 50 also includes a ROM 52. The hard disk controller 50 is connected to a hard disk 54. The hard disk controller 50 may, for example, be a high performance hard disk controller such as a SCSI controller, while the hard disk 40 may be a low to medium performance hard disk provided for minimum functionality of the computer system C. As another example, a tape drive 56 can be incorporated via one of the slots 48. As yet another example, a network interconnection controller (NIC) 58 may be provided in one of the slots 48. Preferably the NIC card 58 includes a ROM 60 for reasons to be discussed.

Figure 2:
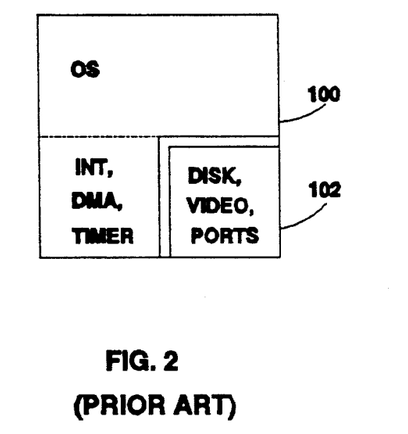
FIG. 2 is a representation of the segmentation of the operating system software according to the prior art.

The computer system C will be run by an operating system. Organizations of operating systems according to the prior art are generally shown in FIG. 2. Exemplary operating systems are MS/DOS by Microsoft Corporation and UNIX by a number of vendors. The operating system is partitioned so that there is main operating code 100 and a device driver area 102. The device driver area 102 addresses certain generally changeable aspects of the computer system C, such as the disk drives, the video or terminal units and the various serial and parallel ports. The main operating system code 100 includes the basic operating system kernel itself and certain code relating to interrupt processing, direct memory access control, timing functions and similar system control oriented functions. The particular problem as noted in the background is that the interrupt control, DMA and timer functions are also hardware related items performed by certain devices on the system board. Because the various hardware system functions such as interrupts, DMA and timers may be at different memory locations or addressed by completely different manners in different computer systems, the operating system 100 is not readily transportable between different types of computer systems.

Figure 3:
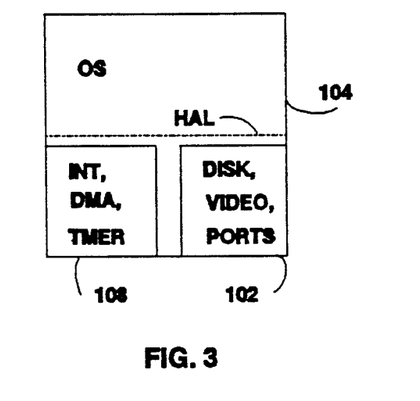
FIG. 3 is a representation of the operating system segmentation according to the present invention.

To this end, an operating system according to the present invention is configured as shown in FIG. 3. The operating system kernel itself is shown as element 104. The complete operating system image also includes the device drivers 102 as in the operating systems of the prior art but also incorporates modules 108 relating to the remaining hardware functions such as the interrupts, DMA and timers and other hardware related activities. These device drivers 102 and the hardware modules 108 are separated from the operating system kernel 104 by a boundary referred to as the hardware abstraction layer or HAL. Reference is made to functions provided by the hardware modules 108 and device drivers 102 by means of a defined calling structure which depends on the particular operating system. The function is performed and any result returned according to the convention. By assuring that all of the hardware related services are not contained in the operating system kernel 104, the operating system kernel itself is readily transportable between systems of various manufacturers and types. Only the various device drivers 102 and system hardware functions 108 are platform related, with those elements being provided by the manufacturer.

Figure 4:
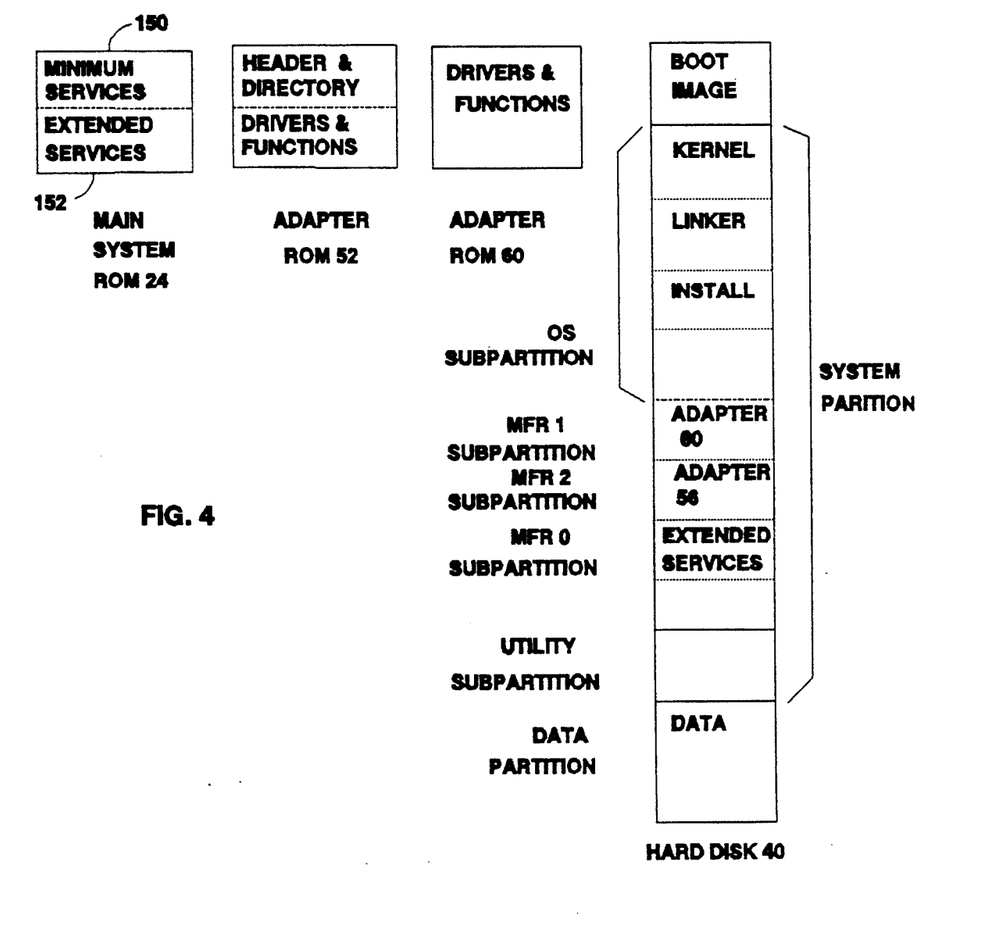
FIG. 4 is an illustration of the various software storage elements and internal allocations of the software storage elements of a computer system according to the present invention.

Then comes the problem of how to generate a particular complete operating system image with all of these variable functions. As noted in the background this has been a problem. However, this problem is particularly addressed by the present invention. Referring now to FIG. 4, the organization of the various software modules device drivers and operating system portions in a system according to the present invention is illustrated. For example, the main system ROM 24 contains two types of functions or services, certain minimum ROM services 150 which are necessary for operation and extended services 152 which provide functions beyond the minimum. For example, the minimum ROM services 150 include interfaces to certain minimum hardware functions which are provided on the computer system, such as the interrupt controller, the DMA controller, the timer, the terminal T, the floppy drive 36 and the hard disk 40 in the illustrated computer system C. Further, the minimum ROM services 150 include sufficient functionality to allow access to files based on file names, which are developed according to certain defined file formats. Thus the minimum ROM services 150 allow any calling programs which must utilize ROM-based functions to utilize at least file level access. The minimum ROM services 150 provide the capability to access files on the hard disk 40, for example, without the loading or booting of any files from the hard disk 40.

If however, a second hard disk unit such as hard disk drive 54 is to be utilized in development, configuration and/or loading of the operating system boot image, the adapter ROM 52 must contain certain of the minimum ROM services to allow file level access to the particular hard disk drive 54. To this end the adapter ROM 52 contains a header and a directory structure much like a disk. The header is provided to allow the CPU 22 to determine the particular functions of the firmware or software located in the ROM 52. This header and the directory structure are shown below for an exemplary EISA adapter board.

| Relative Address | BIT Position |         |
|---|---|---|
|  | 7 | 0 |
| 0×00 | 0×55 |  |
| 0×01 | 0×00 |  |
| 0×02 | 0×AA |  |
| 0×03 | 0×FF |  |
| 0×04 | Firmware Size |  |
| 0×06 | Reserved-Z |  |
| 0×08 | Product ID |  |
| 0×0F | Reserved-Z |  |
| 0×10 | Folder Count |  |
| 0×14 | EISA Version |  |
| 0×15 | EISA Revision |  |
| 0×16 | Firmware Version |  |
| 0×17 | Firmware Revision |  |
| 0×18 | Checksum Byte |  |
| 0×19 | Reserved-A |  |
| 0×1C | Folder Directory Link |  |
| 0×20 |  |  |

Four pattern fields are present in the EISA header: 55, 00, AA, and FF. These patterns are used for test purposes and are part of the signature of a valid option module firmware header.

Firmware Size is a 16 bit value that represents the length of the firmware (including header, directory, and folder sections) in 512-byte blocks.

Reserved-Z is reserved bytes; must be a zero value.

Product ID (Expansion Board Identifier) is the unique 7-character (7 byte) identifier that matches the EISA expansion board's readable product ID.

Folder Count is a 16 bit value that specifies the number of folder directory entries contained within this directory or folder.

EISA Version is a byte that represents the version of the EISA specification supported by this module.

EISA Revision is a byte that represents the revision of the EISA specification supported by this module.

Firmware Version is a byte that contains an ASCII character. This byte represents the version of the module. This field, in conjunction with the Firmware Revision, is used when comparing the ROM-based module with a corresponding loadable or disk-based option module so that the most recent version of the folders or modules can be used.

Firmware Revision is a byte that contains an ASCII character. This byte represents the revision of the module.

Checksum Byte a byte set so that the checksum of the Header and Directory is 0×00.

Reserved-A is three bytes which can contain any value.

Folder Directory Link is a word which represents the offset, in words, from the beginning of the EISA header to the beginning of the folder directory.

The folder directory is present if the system is to access any of the folders or modules. The folder directory contains information that is used by the system module firmware to determine the name, type, size, and location of each folder. The folder directory is stored in the adaptor ROM at the location specified by the Folder Directory Link, typically immediately following the header.

The folder directory contains one directory entry for every folder in the adaptor ROM. Therefore, the directory is an array containing Folder Count directory entries. The format of a folder directory entry is depicted below.

|  | 7 | 0 |
|---|---|---|
| 0×00 | Folder Name |  |
| 0×0C | Reserved |  |
| 0×0E | Folder Type |  |
| 0×0F | Folder Checksum Byte |  |
| 0×10 | Folder Size |  |
| 0×14 | Folder Link |  |
| 0×18 |  |  |

Folder Name is a 12-byte field that contains the name of the folder.

Reserved bytes; must be a zero value.

Folder Type is a byte that contains a single ASCII character. The byte contains a code that indicates the folder type. Exemplary preferred folder type values are: (0×41) Relocatable text and data in an object format. (0×42) Binary data.

The combination of Folder Name and Folder Type must be unique within the folder directory.

Folder Checksum Byte is a byte set so that the checksum of the folder (located by Folder Size and Folder Link) is 0×00.

Folder Size is a word that contains the length of the folder in words.

Folder Link is a word that represents the offset (in words) from the beginning of the header to the beginning of the folder.

If direct loading of the boot image from a network drive is desired, the NIC ROM 60 would also include a header and directory structure. Folders or drivers would be provided to allow access to the network drive to allow the boot image to be obtained.

Preferably the adapter 50 also includes information so that the CPU 22 can determine if ROM-based modules are present by means other than simply searching memory for the header characteristics. In an EISA system, this indication is provided in a designated input/output bit, with a port providing the ROM address.

If a particular adapter is not necessary for initial load or configuration operations, then the adapter ROM need not include the header and directory information as described above. Instead the software necessary to utilize the adapter ROM may be located in a particular driver partition located on the storage media of designation. In addition, an adaptor may not contain a ROM. If so, then the driver may be located entirely on the disk drive. If a driver or folder is located on a disk drive, it must be loaded in the proper partition or directory as noted below and conform to certain naming standards.

The filenames of the modules or folders on the disk drive incorporate the manufacture and board identification of the associated adapter and the version and revision. In an EISA system, the EISA ID is used. The 7-digit EISA ID comprises the first 7 characters of the filename. The version is the eighth character. The characters LF (used to represent Loadable object module Firmware) comprise the first 2 characters of the extension. The revision is the third character of the extension. For example, if:

| | |
|---|---|
| EISA Board ID | = HMR1024 |
| Version | = C |
| Revision | = 0 |
| Then Filename | = HMR1024C.LF0 |

The file then includes a header and directory according to the ROM-based definition described above.

The Version and Revision that are represented in the loadable option module firmware filename must be the same ASCII characters that are found in the Firmware Version and Firmware Revision fields of the header that is in the loadable option module firmware file.

Shown in FIG. 4 is the organization, very approximately, of locations of the various drivers, functions and modules. In the example, the hard disk drive 40 is the particular boot device in the computer system C. In the illustrated example the main system ROM 24 includes certain minimum services 150 as described and extended services 152. The adapter ROM 52 is illustrated as having a header and directory as described, and various drivers or folders. The adapter ROM 60 is illustrated as not having a complete header or directory and so cannot be involved in the initial configuration or loading activities.

The hard disk drive 40 is preferably organized into a series of partitions and subpartitions. One partition can contain the operating system full boot image for later use. During the initial configuration this area is preferably empty and will be occupied once a fully configured and assembled operating system is developed. The disk 40 would next contain a directory partition which allows the system C to keep track of the various partitions, subpartitions and files and so on, as is conventionally done on a hard disk.

One partition required for operation according to the present invention is a system partition. The system partition is reserved for the operating system, the drivers and utility software. The system partition contains a number of subpartitions or subdirectories.

One such subpartition is the operating system partition, which in turn includes further subpartitions for including the various modules of each operating system, such as the operating system kernel, a linker and loader if necessary, and an INSTALL program. The operating system subpartition can include several different operating system partitions if desired, each in a separate subpartition. Additional subpartitions in the system partition preferably are provided for each manufacturer providing driver programs. Preferably these subpartitions are named based on the manufacturers EISA ID in an EISA system. The subpartitions hold files or modules as previously described. In the illustrated example, programs are provided to utilize the adaptor 60, the adapter 56 and the extended ROM services 150. Preferably the disk 40 also contains a large data partition for the storage of conventional files.

Figure 5:
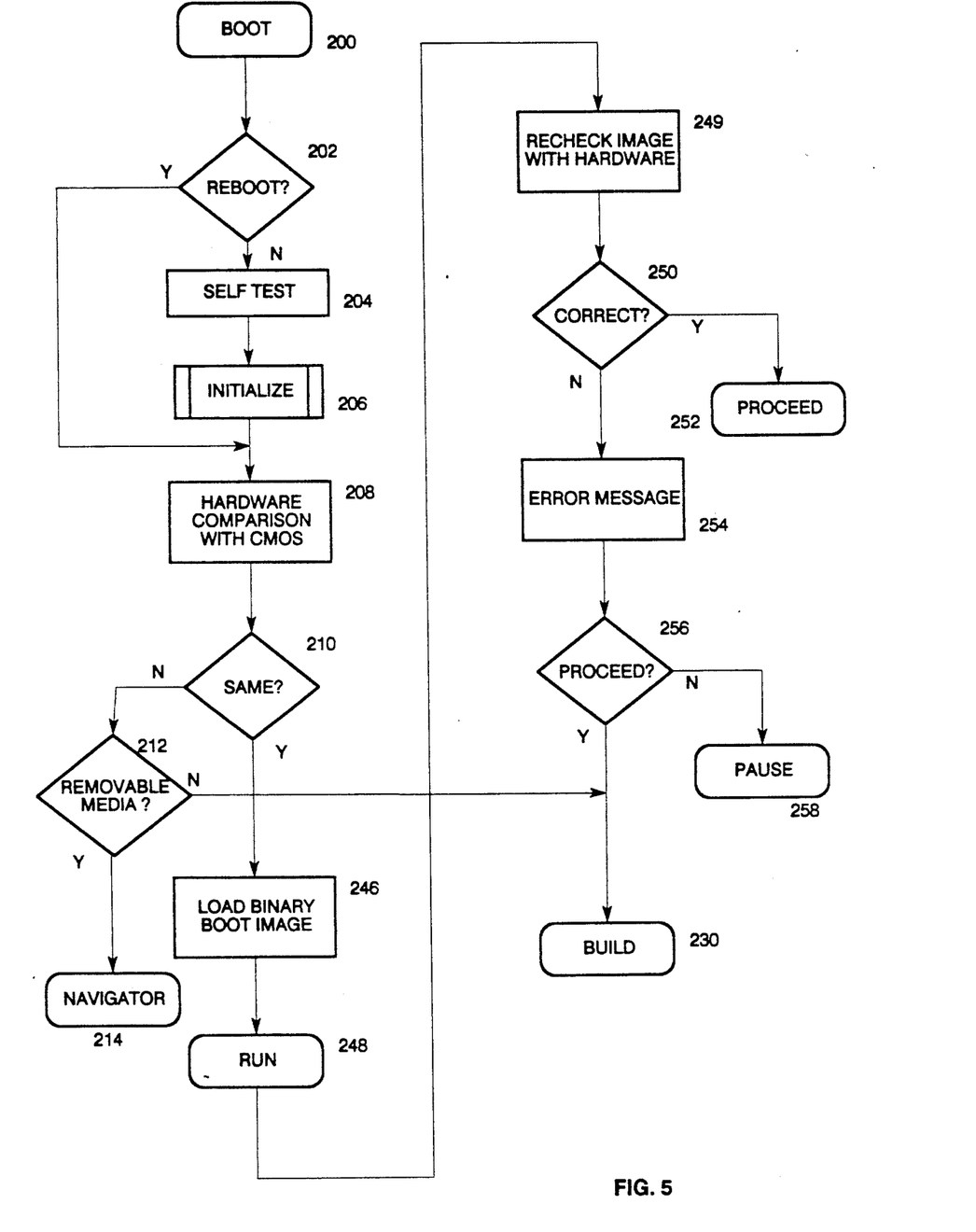
FIGS. 5, 6, 7 and 8 are flowchart illustrations of operating sequences of a computer system according to the present invention.

Operating system boot image development of a system according to the present invention occurs as generally shown in FIGS. 5, 6, 7 and 8. The boot sequence 200 of the computer system C is shown in FIG. 5. In step 202 the computer system C determines if this is a reboot operation. If not, control proceeds to step 204 to perform a self test. After step 204 an initialize routine 260 is performed as step 206. This operation is detailed below. After step 206, or step 202 during a reboot, control proceeds to step 208, where a hardware comparison is made by monitoring the slots 48 and other locations to insure that no hardware or devices have changed between the previous boot and the current boot of the computer system C. The list developed during a review of the installed devices is compared with a list maintained in the CMOS memory 28 or other location. If the hardware is not the same as determined in step 210, control proceeds to step 212 because it is now necessary to redevelop the boot image of the operating system. In step 212 a determination is made if any removable media, such as a floppy disk or CD-ROM, is present. If so, this indicates a desire to reconfigure and control proceeds to a NAVIGATOR sequence 214 located on the removable media. If not, a rebuild or redevelopment of the operating system is proper and control proceeds to a BUILD sequence 230.

Figure 6:
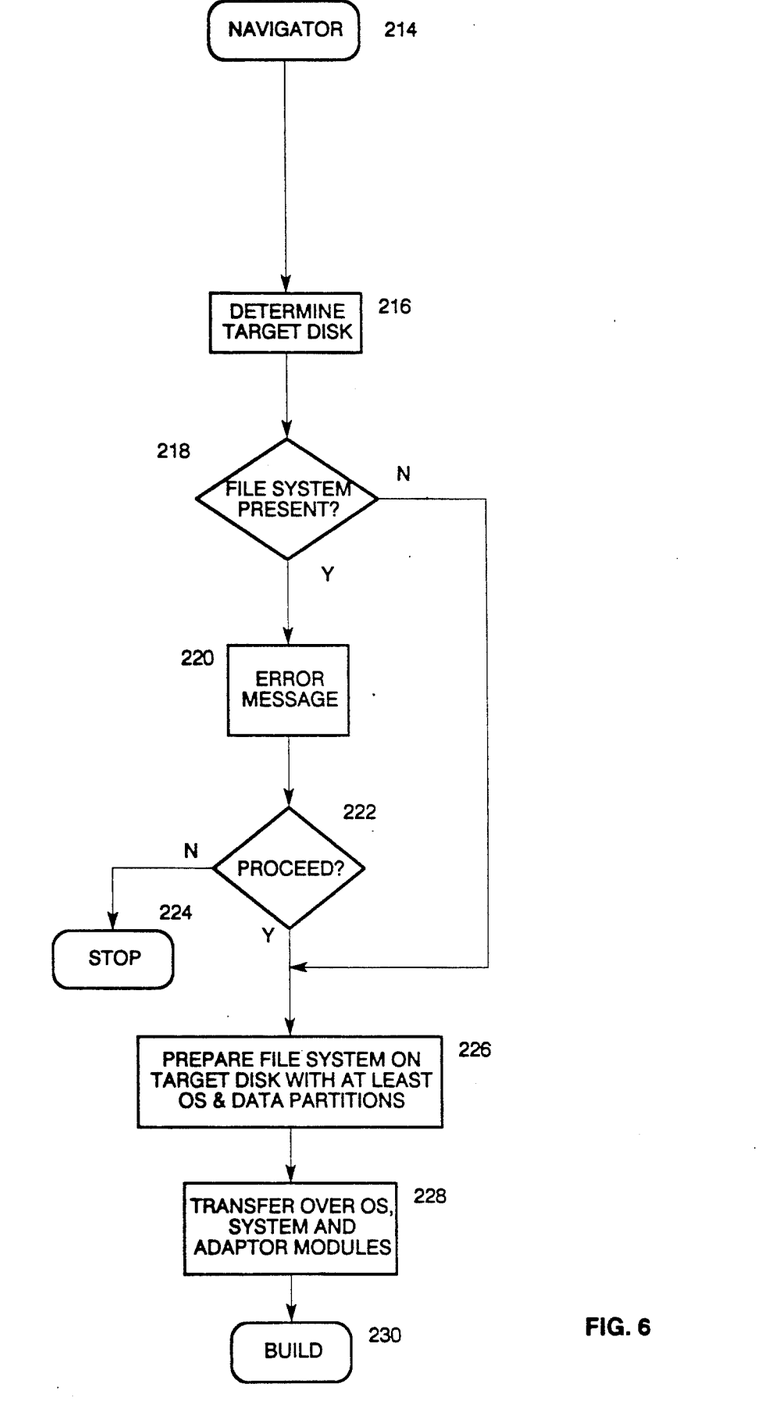

In FIG. 6, the sequence referred to as the NAVIGATOR or configuration sequence 214 is shown. It is noted that the NAVIGATOR sequence 214 preferably is designed to utilize only the minimum ROM services 150 because it is assumed that no valid configuration exists and so only the minimum services are present, though other services can be utilized if available. The operation of the sequence 214 begins at step 216. In step 216 the computer system C requires the operator to determine the target disk of interest on which the setup is to be performed. Preferably this response is stored in the CMOS memory 28 for later use. In step 218 the computer system C determines if a file system is present on the particular target disk. If so, an error message is generated and control proceeds to step 222 to determine if the operation is to continue. If not, the program exits at step 224. This would allow the target disk designation to be changed, for instance from a default or local disk to a network disk without overwriting a prepared system on the new target drive. If a request to proceed is determined in step 222 or if no file system is found in step 218, control proceeds to step 226, where a file system is prepared on the target disk, overwriting any previous file system. The file system is prepared with the directory structure as indicated in FIG. 4, preferably with a reserved boot area, and at least system and data partitions. If numerous operating systems are to be utilized, then several operating system subpartitions will be developed. This process is often referred to formatting a disk or making a target disk in the UNIX environment. If a disk drive other than the disk drive 40 is to be used for this purpose, the appropriate driver folder must be present in an option ROM and this folder installed during the initialization sequence 260.

Figure 7:
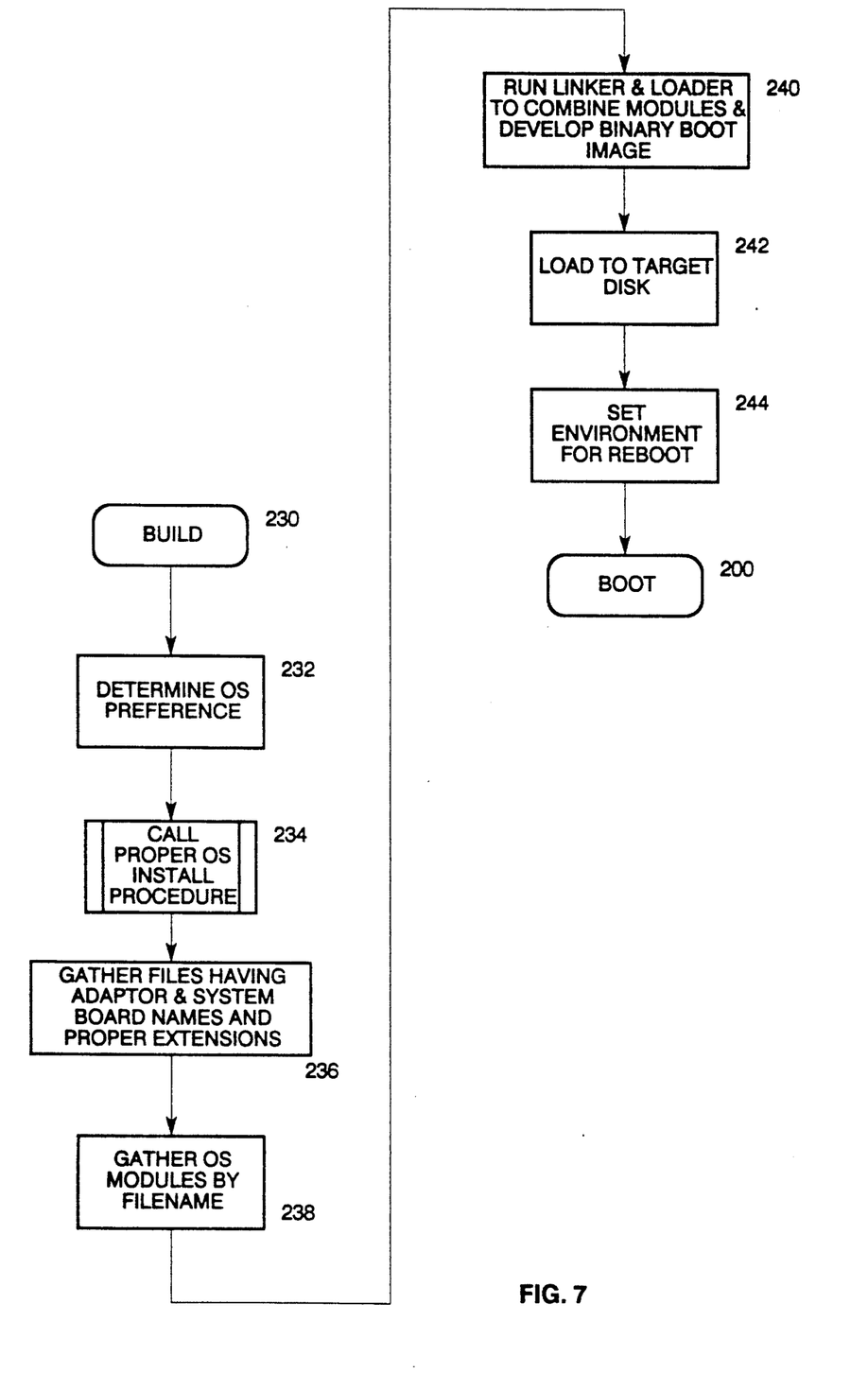

Control then proceeds to step 228 where the various operating system modules which are located on preferably a floppy disk or CD-ROM are transferred to the hard disk operating system subpartition. Additionally, any particular adapter and system modules or folders which are necessary are transferred to the desired manufacturer's subpartition, with the subpartition being created if necessary. The determination of the need to create at least some of the subpartitions can be done automatically by having the NAVIGATOR sequence 214 sense the various adapters which are located in the slots 48, with the adapters preferably indicating manufacturer identification and board type information. Similarly, the system manufacturer and board type can be determined. This manufacturer and board type identification can then form a file name with a predefined extension, as described above. Alternatively, the initialization sequence 260 could develop this information and make it available to the NAVIGATOR sequence 214. The NAVIGATOR sequence 214 in step 228 then requests the particular files. Once the files are sensed as being present, they are transferred to the appropriate subpartition. Control proceeds from step 228 to the initial operating system boot image development or BUILD program 230 after all the modules have been obtained. The BUILD sequence 230 is shown in FIG. 7.

The BUILD sequence 230 starts at step 232, where the operating system preference for this particular computer system C is determined. This could be determined in a number of ways. First, if only one operating system subpartition was determined to exist on the desired boot disk, then there would be no preference and it would be automatically determined. If two operating system subpartitions were actually found, then either the operator could be queried for each installation or a particular designated bit in the CMOS memory 28 could be referenced. After the operating system preference has been determined, control proceeds to step 234, where the INSTALL program located in the desired operating system's subpartition is executed. Control proceeds to step 236 in the INSTALL program, where the various modules necessary based on the adaptor, system board and operating system identification as developed by the initialization sequence 260 or the NAVIGATOR sequence 214 are gathered. Any ROM-based modules are gathered from the particular ROM, based on the manufacturer and product identification and revision number. Any disk-based modules are then gathered from the appropriate manufacturer's subpartition. It is noted that a module from disk could also be gathered where a ROM-based module has previously been gathered. The disk-based module would overwrite the ROM-based module to allow distribution of updates or enhancements without requiring ROM replacement. At the end of step 236, all of the non-operating system modules or folders necessary to develop the boot image of the operating system for the particular computer system are present.

Control then proceeds to step 238, where certain operating system modules are gathered for use. This is preferably be done by file name, certain file names having been previously designated for standard purposes. At the end of step 238 all the modules necessary to develop the boot image are present. Control then proceeds to step 240, where a linker and loader program is executed to combine and link together all the various modules and to develop a binary boot image format of the complete operating system. Control then proceeds to step 242 where the binary boot image is loaded on the target disk as identified by the NAVIGATOR sequence 214 or as stored in the computer system C. Control proceeds to step 244, where an environment variable is set to indicate that a re-boot operation is being performed. Control then proceeds to the BOOT sequence 200, where the computer system C is re-booted.

Upon entering the BOOT sequence 200, control proceeds from step 202 to step 208 to step 210. In this instance the hardware compares the same, so control proceeds to step 246, where the binary image of the operating system is loaded from the previously specified target disk. In step 248 the operating system is activated by passing control to the RUN sequence or entry point. Control then proceeds to step 249 where a more detailed comparison of the boot image drivers and the existing hardware is performed. This instance is provided for certain situations, such as booting from a network, where a common image may have been changed. If the correlation is proper as determined in step 250, execution under the operating system begins at step 252. If not, control proceeds to step 254, where an error message is displayed. Control proceeds to step 256, where the operator is queried whether to rebuild or stop. If the command is to rebuild, control proceeds to the BUILD sequence 230. If to stop, the computer system C then halts operation at step 258.

Figure 8:
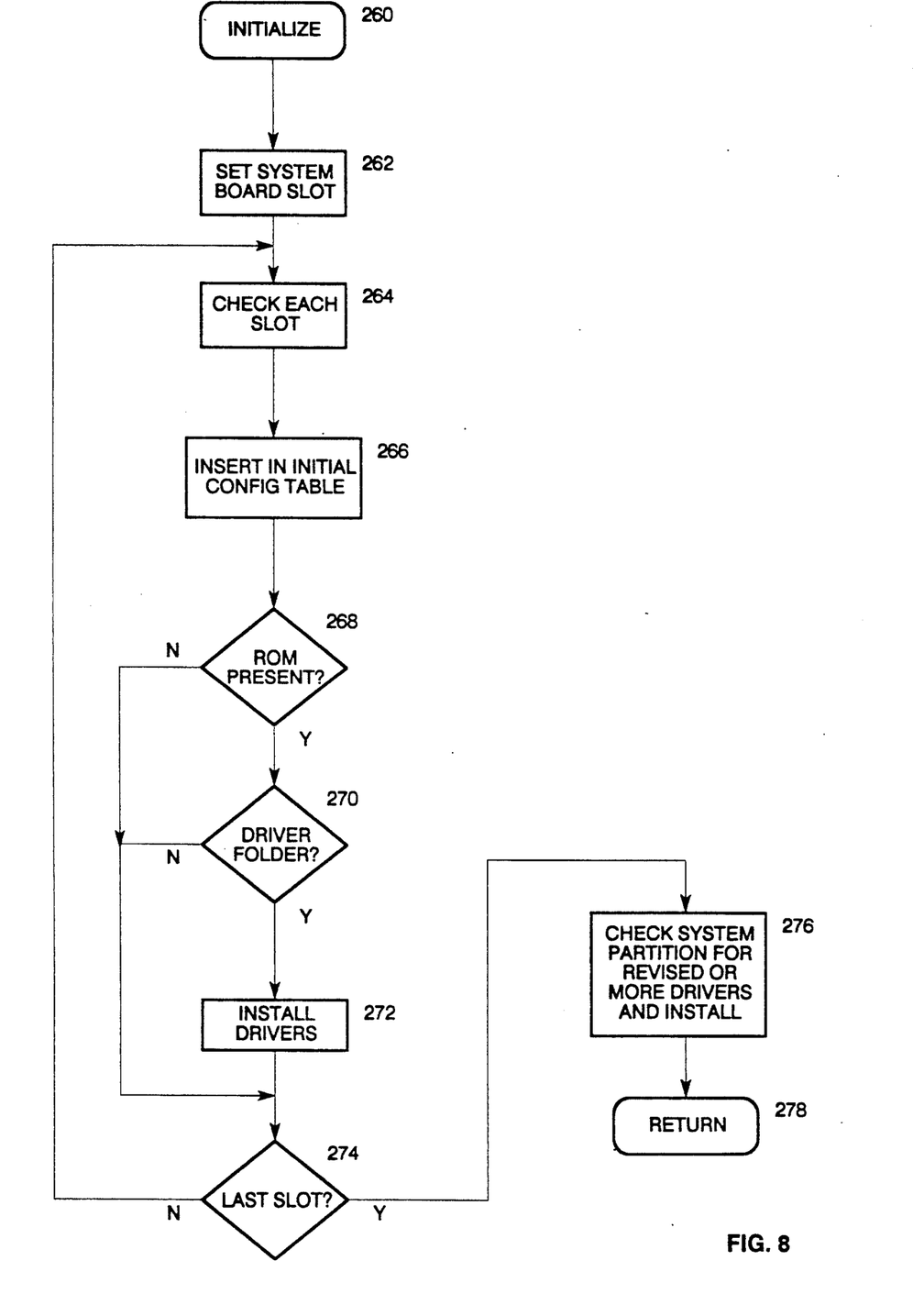

The INITIALIZE sequence 260 is shown in FIG. 8. The sequence 260 begins operation at step 262, where a pointer is set to indicate the system board pseudo-slot for scanning purposes. Control proceeds to step 264 where the indicated slot in the computer system C is checked for the various devices present in the slot. Control proceeds to step 266 where the resulting configuration information is placed in a configuration table for storage and later use. Control proceeds to step 268 to determine if a ROM is present in that slot. This is done by either determining if a ROM is present by reviewing the specific location as previously discussed or scanning the memory space looking for the proper pattern. If a ROM is present, the ROM is reviewed to determine if any driver folders are present in step 270. This is done based on the header and directory structures as previously defined. If so, the drivers are loaded and installed for use during the build and boot processes. After the drivers are installed or if no ROM is present in step 268 or no driver folders are present in step 270, control proceeds to step 274 to determine if the last slot was checked. If not, control returns to step 264, the pointer is incremented and the next slot is reviewed. If so, control proceeds to step 276, where the system partition on the target disk is scanned to determine if revised drivers are present to update those loaded from ROM or if drivers are present for devices not having ROM support. If no system partition is present or a target disk is not identified, this step is skipped. Control then proceeds to step 278, which is a return to the calling program, the BOOT sequence 200 and step 206 in the illustrated embodiment. In this manner the computer system C automatically determines the various devices present and loads the available drivers.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for developing a bootable computer system, comprising the steps of:
    the computer system determining the devices present in the computer system;
    the computer system determining if the devices present in the computer system have changed since the last boot of the computer system;
    the computer system loading a stored developed boot image if the devices have not changed; and
    the computer system proceeding to boot image development if the devices have changed wherein:
    the computer system determines if the device includes software to allow basic functioning of the device for each device present;
    the computer system install the software determined to be present to allow basic functioning of the devices;
    the computer system determining if boot image development is desired;
    the computer system determines the desired operating system if development is desired;
    the computer system obtains the software related to the various devices present to be incorporated in the boot image of the operating system;
    the computer system obtains the operating system software to be incorporated in the boot image of the operating system;
    the computer system develops the boot image of the operating system from the obtained software; and
    the computer system stores the developed boot image for later use by the computer system upon a later boot operation.

2. The method of claim 1, further comprising:
    executing the operating system after loading the developed boot image;
    determining if the devices present are the same devices for which the boot image was developed; and
    proceeding with execution of the operating system if the devices are determined to be the same.

3. The method of claim 1, further comprising:
    determining a target software location if development of a boot image is not desired;
    preparing the target location for receiving software; and
    transferring software relating to the operating system and devices present to the target location.

4. The method of claim 3 wherein said step of determining if boot image development is desired includes determining if a removable storage medium is present in the computer system.

5. The method of claim 1, wherein the step of determining if the devices present include software includes determining if a semiconductor memory device is associated with the device and determining if software to allow the basic functioning of the device is present in the memory device.

6. The method of claim 5, wherein said step of determining if the devices present include software further includes determining if software associated with a device is present on a storage media other than the device semiconductor memory and using said software instead of the software located in the device semiconductor memory.

* * * * *